United States Patent Office 2,706,060
Patented Apr. 12, 1955

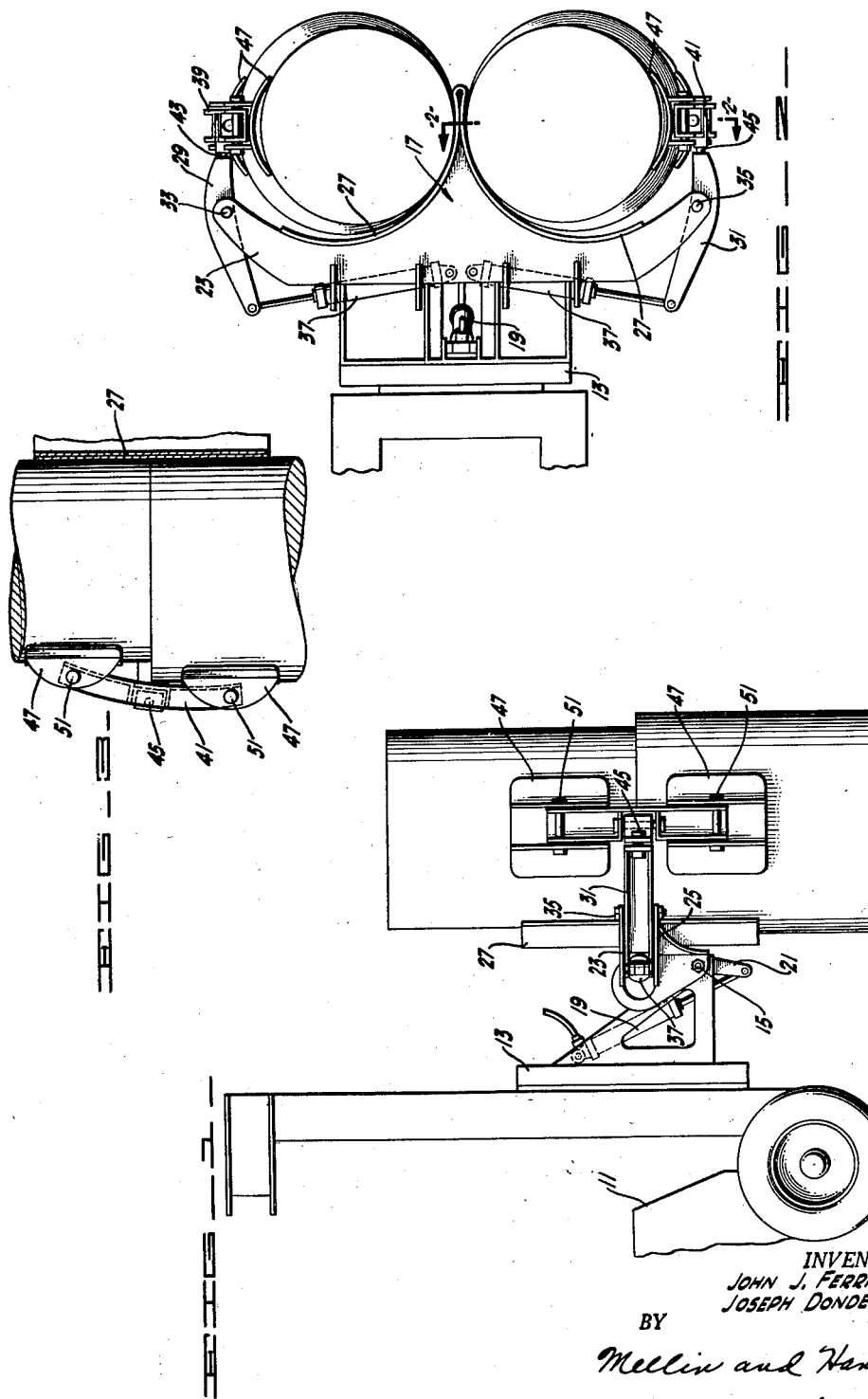

2,706,060

APPARATUS FOR LIFTING AND TRANSPORTING CYLINDRICAL ARTICLES

John J. Ferrario, San Francisco, and Joseph Dondero, San Anselmo, Calif.

Application February 23, 1952, Serial No. 273,074

3 Claims. (Cl. 214—652)

This invention relates to an apparatus for lifting articles, particularly heavy cylindrical objects such as newsprint paper rolls. The present invention constitutes an improvement over our prior patent for Apparatus for Lifting Cylindrical Objects, No. 2,497,118, granted February 14, 1950.

In our prior patent, there is disclosed an apparatus ideally suited for picking up, tilting and transporting cylindrical objects, such as rolls of newsprint paper, particularly pairs of such rolls in end-to-end relation. In many instances, the rolls of paper have the same diameters. However, in other instances, the diameters of the paper rolls vary, such as where different sizes of rolls are ordered or where rolls of supposedly the same sizes have different diameters. In these latter instances, it is virtually impossible for an apparatus such as disclosed in our prior patent and other prior apparatuses to pick up, tilt and transport pairs of heavy newsprint rolls and like articles having different diameters, because of the lack of a tight clamping engagement between the swingable clamping jaws and the exteriors of the pairs of rolls.

A main object of the present invention is to provide an apparatus for lifting heavy cylindrical objects, which apparatus is so constructed that it can be operated to readily pick up, tilt and transport a pair of end-to-end cylindrical objects of different diameters; to provide such an apparatus having a stationary jaw and a pivotally mounted movable jaw carrier carrying a pair of pivoted movable jaws, which carrier is tilted, when the movable jaws thereof engage a pair of end-to-end rolls of different sizes, to dispose each of the jaws in engagement with its associated roll, and which movable jaws can tilt to insure their correct contact with the rolls.

Various objects of the present invention will be apparent from the following description taken in connection with the accompanying drawings wherein:

Fig. 1 is a view in side elevation showing an apparatus embodying the concepts of the present invention.

Fig. 2 is a plan view of the apparatus disclosed in Fig. 1.

Fig. 3 is a fragmentary sectional view taken generally along line 3—3 of Fig. 2 and showing the operation of the apparatus when lifting a pair of cylindrical objects of different diameters.

The particular embodiment of our invention disclosed in the drawings is shown in engagement with heavy newsprint rolls, but the invention is not intended to be limited to lifting this type of cylindrical object or, in fact, cylindrical objects, although obviously the concepts of the invention are ideally suited for embodiment in an apparatus for lifting heavy cylindrical objects. Furthermore, the specific embodiment disclosed is adapted for lifting two pairs of end-to-end cylindrical objects, but it is obvious that an apparatus constructed to lift only one pair of end-to-end cylindrical objects is within the concepts of the present invention.

Referring to the accompanying drawings wherein similar reference characters designate similar parts throughout, there is disclosed an industrial lift truck of common design, said truck being generally entitled 11 and carrying a frame 13 on the front thereof. Truck 11 has a suitable mechanism well known in the art for elevating and lowering frame 13. Swingably mounted on frame 13 about a horizontal axis 15 is a second frame generally entitled 17. A suitable hydraulic actuator 19 is provided and connected to a pair of arms 21, which in turn are connected to or formed integrally with frame 17. Upon supplying fluid to the hydraulic actuator, the frame is adapted to be swung to the position shown in Fig. 1 downwardly to engage cylindrical objects lying on their sides and upon a reverse supply of hydraulic fluid to actuator 19, frame 17 is adapted to be swung upwardly to the position shown in Fig. 1.

Frame 17 includes a pair of frame plates 23 and 25 suitably connected in spaced relation by spacers (not shown). Plates 23 and 25 are formed to provide a pair of arcuate recesses facing forwardly, and secured to the arcuate forward portion of plates 23 and 25 is a supporting plate 27 formed to the curvature of the forward portions of plates 23 and 25 and providing a pair of generally oppositely facing fixed jaws for engagement with pairs of cylindrical objects. There are a pair of arms 29 and 31 pivoted to and between plates 23 and 25 at 33 and 35, respectively. The arms are adapted to be actuated by hydraulic actuators 37 connecting the rear ends of the arms with frame 17. The structure up to this point is substantially identical with the structure disclosed in our prior patent.

On the forward ends of arms 29 and 31 are movable jaw carriers 39 and 41, respectively, each carrier being mounted for pivotal movement about pivots 43 and 45, respectively. As is apparent from the figures, the pivots are so arranged that the carriers pivot about axes longitudinal of their respective arms, said pivotal axes also being generally perpendicular to the direction of movement of the movable jaws and to the lengths of the fixed jaws. Pivotally mounted on each of the carriers is a pair of movable jaws 47. The movable jaws for each carrier are pivoted to the ends of the carrier for swinging movement about pivots 51, the swinging movement of the movable jaws enabling them to correctly contact articles to be picked up. As is apparent from Fig. 2, the jaws are arcuate in formation.

As is apparent from Fig. 3, when the apparatus of the present invention is manipulated so as to bring the fixed jaws 27 and the movable jaws 47 into approximate embracing relationship with two end-to-end pairs of paper rolls, the hydraulic actuators 37 can be supplied with hydraulic fluid to move movable jaws 47 toward the fixed jaws to cause an engagement of the movable jaws with the paper rolls. Where the paper rolls are of different diameters such as in the case shown in Fig. 3, the carriers 39 and 41 will pivot about their pivots 43 and 45 to allow each movable jaw of a pair of movable jaws to tightly clampingly engage its associated roll. As previously mentioned, the movable jaws are free to pivot about their pivots 51 for correct contact with the cylindrical configurations of the articles to be picked up.

Normally, the rolls will be lying on their sides, so that frame 17 will be pivoted downwardly about axis 15 for engagement with the rolls and then after the movable jaws 47 have securely clamped the paper rolls between themselves and the fixed jaws, frame 17 can be pivoted upwardly, and thereafter frame 13 can be elevated. The rolls can then be transported to another location and deposited on end if desired.

By the present invention an apparatus has been provided by which a pair of heavy cylindrical objects, such as newsprint paper rolls, of different sizes, can be lifted, tilted and transported without danger of one of the rolls slipping from the clamping arrangement.

While we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. An apparatus of the class described comprising a frame, means for pivotally connecting the frame to a wheeled vehicle, said frame having a fixed jaw adapted to fit against a pair of cylindrical objects disposed end-to-end, an arm swingably mounted on said frame for movement toward and away from said fixed jaw, a jaw carrier pivotally mounted on said arm for movement about an axis extending generally longitudinally of said arm, and a pair of movable jaws pivotally mounted on the jaw carrier, one on either side of the pivotal axis thereof, for pivotal movement about axes parallel with the pivotal axis of the carrier, whereby the jaws are adapted for simultaneous clamping engagement with a pair of cylindrical objects, even though the objects are of different diameters.

2. An apparatus of the class described comprising a frame, means for pivotally connecting the frame to a wheeled vehicle, said frame having a fixed jaw adapted to fit against a pair of cylindrical objects disposed end-to-end, an arm swingably mounted on said frame for movement toward and away from said fixed jaw, a jaw carrier pivoted on said arm for movement about an axis extending generally longitudinally of said arm, and a pair of jaws pivotally mounted on the jaw carrier, one on either side of the pivotal axis thereof, for pivotal movement about axes parallel with the pivotal axis of the carrier, whereby the jaws are adapted for simultaneous clamping engagement with a pair of objects, even though the objects are of different sizes.

3. An apparatus for lifting pairs of cylindrical articles of different diameter positioned in end to end abutment comprising a lifting frame pivotally movable about a horizontal axis, a jaw fixed upon the frame, an arm pivoted upon the frame for movement relative to the fixed jaw about an axis perpendicular to the pivot axis of the frame, a movable jaw carrier pivoted at a point near its center to an end of the arm upon an axis perpendicular to the axis of the arm and in substantial axial alignment with the arm, and a pair of movable jaws pivoted upon the ends of the carrier for independent movement about axes parallel to the pivot axis of the carrier upon the arm, said carrier being tiltable about its axis for moving the jaws variable amounts into simultaneous gripping engagement with articles of different diameter clamped thereby against the fixed jaw.

References Cited in the file of this patent

UNITED STATES PATENTS

| | | |
|---|---|---|
| 1,519,736 | Lewis | Dec. 16, 1924 |
| 1,717,194 | Daoust | June 11, 1929 |
| 1,900,569 | Lederer | Mar. 7, 1933 |
| 2,412,845 | Stevens | Dec. 17, 1946 |
| 2,497,118 | Ferrario et al. | Feb. 14, 1950 |
| 2,554,433 | Warren | May 22, 1951 |
| 2,596,477 | Frischmann et al. | May 13, 1952 |
| 2,597,760 | Strahm | May 20, 1952 |
| 2,604,220 | Frischmann | July 22, 1952 |
| 2,674,387 | Ehmann | Apr. 6, 1954 |